May 4, 1965  B. C. HARRIS  3,181,889
TRAILER CLEARANCE DEVICE
Filed June 4, 1962  3 Sheets-Sheet 1

INVENTOR.
BERT C. HARRIS
BY Watts & Fisher
Attys

INVENTOR.
BERT C. HARRIS

United States Patent Office 3,181,889
Patented May 4, 1965

3,181,889
TRAILER CLEARANCE DEVICE
Bert C. Harris, Chagrin Falls, Ohio, assignor to The White Motor Company, Cleveland, Ohio, a corporation of Ohio
Filed June 4, 1962, Ser. No. 199,928
24 Claims. (Cl. 280—438)

This invention pertains to vehicles, and more particularly to a novel and improved coupling assembly for connecting a highway tractor to a trailer.

In the trucking industry tractor-trailer combinations, or rigs as they are known, have received enormous public acceptance especially for over-the-highway shipments. In such a rig, the tractor and trailer are connected together by a pivotal coupling. Normally this pivotal coupling consists of a structure known as a fifth wheel which is supported on the frame of the tractor and a king pin which is removably and pivotally connected to the fifth wheel. The king pin is fixed to and depends from the frame of the trailer.

One of the principal problems encountered with tractor-trailer rigs is the problem of providing clearance between the tractor and trailer for relative pivotal movement about the axis of the king pin. Customarily, sufficient clearance is provided between the tractor and the trailer to allow 90 degrees relative rotation in either direction from an aligned position. The provision of this clearance produces several disadvantages. One is that the space between tractor cab and the trailer must be relatively long to accommodate the trailer. Another is that the fifth wheel must be positioned so far rearwardly on the tractor frame that the weight distribution may be uneven with a relatively high load on the rear wheels of the tractor, while the front wheels may not be fully loaded. When the load is improperly distributed the rig cannot be used in a manner in which all axles are loaded to their full, safe and legal capacity so as to transport a maximum pay load. One solution for this latter problem has been described and claimed in U.S. Patent No. 3,002,766, issued October 3, 1961 to B. C. Harris for a Fifth Wheel Construction.

Another problem presented in the prior art is that providing proper clearance between the tractor and trailer reduces the maximum length of the trailer since the overall length must be maintained within safe and legal limits. Since width and height are limited, a shortening of the length of the trailer results in a corresponding reduction of the available space for cargo and therefore of the load carrying capacity of the tractor-trailer rig.

The present invention overcomes all of these and other disadvantages of prior tractor-trailer rigs through a construction wherein the trailer is positioned close to the tractor cab whenever the tractor-trailer are aligned, as when traveling along a straight highway. This permits either (1) a shorter and therefore a safer overall length for any given trailer or (2) the use of longer trailers while still giving due regard to safe and legal overall length. Since a longer tractor-trailer may be employed, obviously the available load space is proportionately increased.

While the present invention clearance is provided when, but only when, it is needed, that is, when the vehicle is going around a curve or when the tractor and trailer pivot relatively for any other reason. This provision of clearance when, but only when, it is needed is obtained by mounting the fifth wheel slidably on the frame of the tractor. A prime mover, in the form of a pair of hydraulic cylinders, is connected to the fifth wheel and to the tractor frame. A control valve is mounted on the frame and connected to the cylinders and to a pump. Whenever the tractor and trailer rotate relatively, a sensing mechanism interposed between the tractor and trailer actuates the valve to cause the cylinders to drive the fifth wheel rearwardly relative to the tractor an amount sufficient and appropriate for clearance. As the tractor and trailer are straightened, the valve is actuated by the sensing mechanism in the opposite direction to cause the fifth wheel to return to its original position.

In the preferred arrangement, a cam is pivotally mounted on the fifth wheel. A sensing arm is secured to the cam and to the trailer so that the arm and cam move with the trailer relative to the fifth wheel and tractor. A cam follower is pivotally mounted on the fifth wheel and is normally maintained in engagement with the cam. Whenever the cam pivots with the trailer the cam actuates the follower, which in turn, actuates the valve through a connecting link.

Another feature of the invention resides in a control system which actuates the valve to a degree that is proportional to the amount of relative turning of the tractor-trailer. With this construction the amount of relative rotation of the tractor and trailer produces a corresponding amount of relative movement of the link and valve, thereby producing a proportionate and correct degree of actuation of the prime mover. Whenever the fifth wheel has reciprocated to an appropriate position for a given relative attitude of the tractor and trailer, the valve will shut off to maintain that position until the tractor and trailer again are pivoted relatively whether they are aligned or not.

Another feature of the control is obtained by utilizing a valve with a control stem that reciprocates. The control stem and its actuating link are longitudinally disposed paralleling the fifth wheel reciprocation. This provides a system which accommodates any slippage in the hydraulic cylinders or silppage in any other prime mover that may be used. Whenever the prime mover slips allowing the fifth wheel to move rearwardly relative to the tractor, the valve will be opened to energize the prime mover and drive the fifth wheel back to the appropriate position.

One of the principal objects of the invention is to provide a novel and improved sensing system for controlling a prime mover in response to relative movement of two members.

Another object of the invention then is to provide a novel and improved coupling assembly wherein the assembly is reciprocated in response to relative movement of two vehicles to provide clearance when and as it is needed.

A further object of the invention is to provide a novel and improved fifth wheel assembly wherein clearance is provided between the tractor and trailer when needed in an amount and at a rate proportionable to the amount and rate of relative turning of the tractor and trailer.

An additional object of the invention is to provide a power mechanism for selectively providing clearance between a tractor and trailer, which mechanism includes a control sensitive to any slippage in the system for automatically returning the system to its desired position whenever slippage occurs.

Other objects and a fuller understanding of the invention may be had by referring to the following description and claims taken in conjunction with the accompanying drawings in which:

Figure 1:
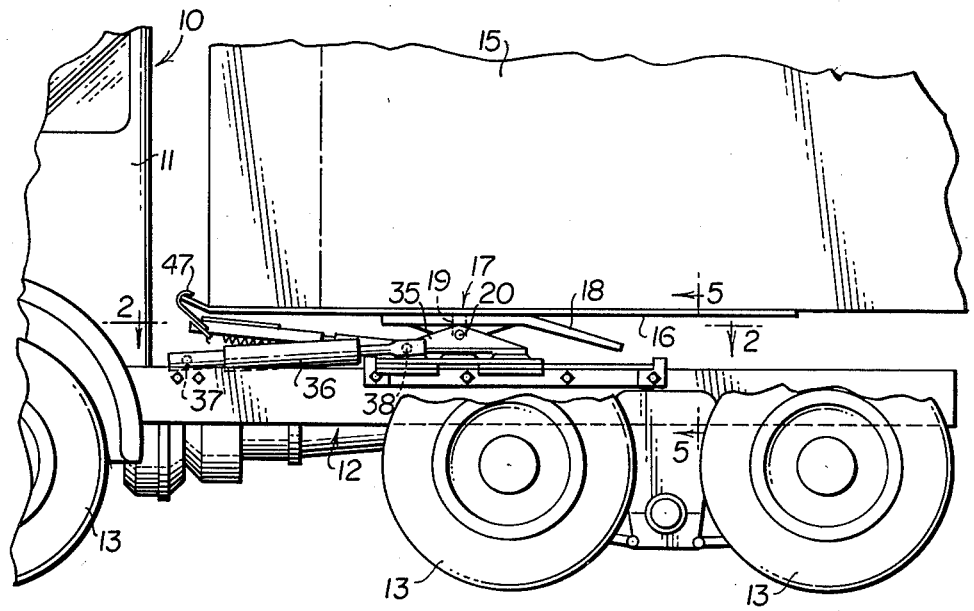
FIGURE 1 is a fragmentary side elevational view of a tractor-trailer rig incorporating this invention.

In FIGURE 1, a fragmentary representation of a tractor is shown generally at 10. The tractor includes a cab 11 which is mounted on the forward end of a frame 12. The frame is supported by suitable road wheels 13.

The forward end of a trailer is shown at 15. The trailer includes a supporting base frame 16 and is pivotally connected to the tractor 10 by a suitable coupling assembly shown generally at 17. The coupling assembly 17 includes the usual fifth wheel 18 which is mounted on the tractor frame 12 in a manner to be described in greater detail below. The fifth wheel is removably connected to a king pin 19 which is secured to and depends from the trailer frame 16 and which depends from the trailer. The fifth wheel 18 is mounted on the usual cross pin 20 for pivoting about a horizontal axis.

*The fifth wheel support assembly*

Figure 2:
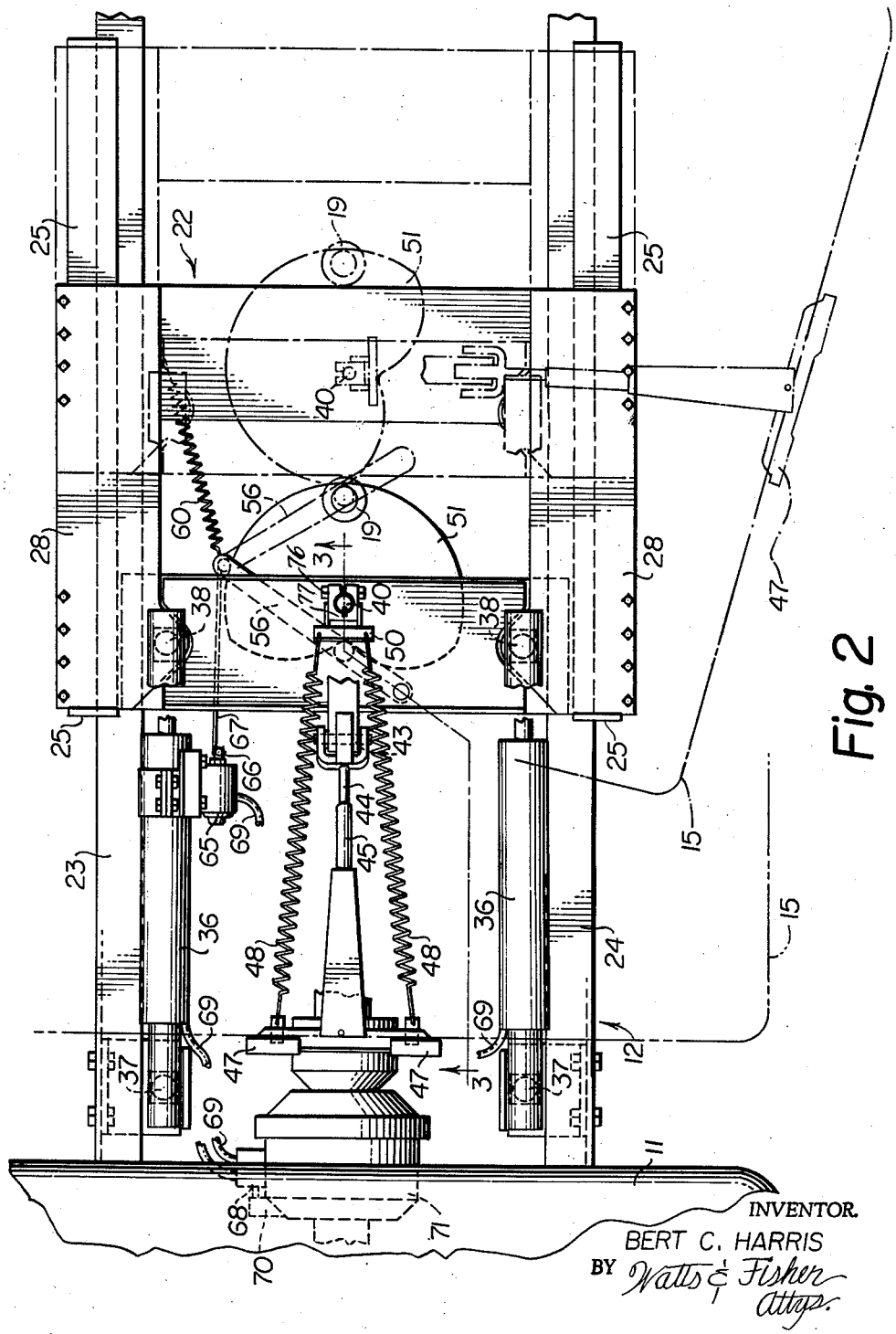
FIGURE 2 is an enlarged view of the improved fifth wheel supporting assembly as seen from the plane indicated by the line 2—2 of FIGURE 1.

Referring now to FIGURE 2, a fifth wheel support assembly is shown generally at 22. This fifth wheel support assembly is slidably mounted on the tractor frame 12 for reciprocal movement relative to the tractor along a longitudinal path.

The tractor frame 12 includes a pair of longitudinally extending channels 23, 24. To provide rigid support for the fifth whel assembly while accommodating reciprocal movement, a pair of guides 25 of T shaped cross section are secured to the channels 23, 24, FIGURE 5. The guides include a downwardly extending central portion which is the leg of the T and which abuts and is secured to the sides of the channel as by bolts 26. The guides each include an upper, flat fifth wheel assembly guiding portion 27. These guiding portions overlie the top of the channels to form guide tracks for the fifth wheel assembly.

A pair of longitudinally extending fifth wheel slides 28 are slidably mounted on the tracks 27. The slides 28 are secured together by suitable cross plates 29. These slides and plates 28, 29 together provide a frame for supporting the fifth wheel. This support of the fifth wheel is accomplished through a pair of cross pin supporting plates 35, only one of which is shown in FIGURE 1. The fifth wheel supporting frame is inhibited against lateral motion by a pair of lateral guides 30, only one of which is visible in FIGURE 5. The lateral guides 30 are secured to the undersides of the slides 28 along their outside edges.

Figure 5:
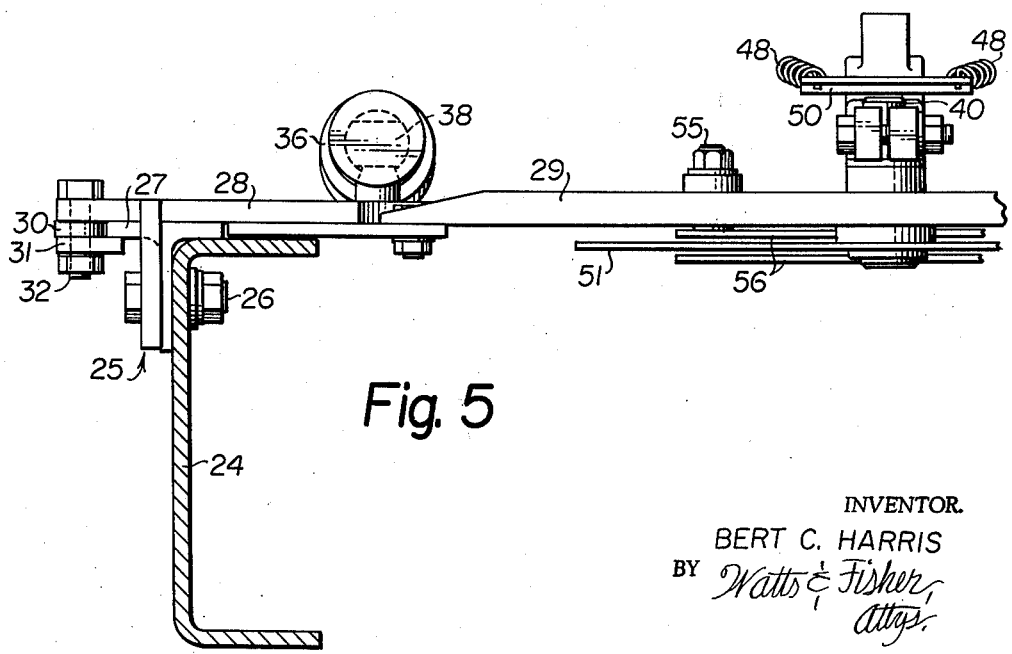

A pair of fifth wheel frame hold-down members are provided, one of which is visible in FIGURE 5 and designated by the numeral 31. As an examination of FIGURE 5 will show the pictured hold-down member 31 overlies the lower surface of the guide track 27. The hold-down members 31 and the lateral guides 30 are suitably fixed to the side plates 28 as by bolts 32.

The fifth wheel support assembly 22 then is slidably mounted on the guide tracks 27 for direct forward and rearward rectilinear movement relative to the tractor 10. This movement of the fifth wheel support assembly 22 and a connected trailer forward and back along these guide tracks 27 is effected by a prime mover in the form of a pair of hydraulic cylinders 36. The cylinders 36 are pivotally connected to the truck frame by a pair of ball and socket joints 37, while a similar pivotal connection to the fifth wheel assembly is provided by a pair of ball and socket joints 38. The selective actuation of these cylinders 36 to cause reciprocation of the fifth wheel assembly is controlled by the sensing and control mechanism that is responsive to relative turning of a tractor and trailer.

*The sensing and control mechanism*

A sensing arm pivot tube 75 is vertically fixed to the forward one of the fifth wheel assembly cross plates 29. A sensing arm pivot pin 40 is rotatably mounted in the tube 75. A support arm 41 is mounted on the sensing arm pivot pin 40 for rotation, with the pin about its axis.

The support arm 41 is split and clamped on the pivot pin 40 by a bolt 76. A key 77 is between the support arm 41 and the pivot pin 40 to prevent relative rotation between the two. A thrust washer 78 is around the pin 40 and between the arm 41 and the tube 75 to absorb thrust loads. A U shaped sensing arm supporting bracket 42 is pivotally connected to the support arm 41 by a horizontally disposed sensing arm pivot 43. A sensing arm bar 44 is fixed to the sensing arm bracket 42. A sensing arm tube 45 is telescoped over the bar 44 for relative reciprocal movement.

A pair of trailer engaging hooks 47 are fixed to the forward end of the sensing arm tube 45 for engagement with the forward end of the trailer 15. A pair of sensing arm springs 48 extend from the hooks 47 to the support arm 41 to bias the sensing arm tube 45 and the connected hooks 47 inwardly toward the sensing arm bracket 42.

The sensing arm springs 48 are connected to a spring connecting bar 50 which is fixed to the top of the support arm 41. The bar 50 and the connections of the springs 48 to the hooks are positioned such that the springs will always define the hypotenuse of a triangle consisting of the sensing arm, the springs and the supporting arm. The purpose of positioning the springs in this manner is to cause the sensing arm to rotate upwardly around the sensing arm pivot 43. With this construction, when the trailer is disconnected from the tractor, the springs will both telescope the sensing arm tube 45 inwardly against the sensing arm bracket 42 and at the same time pivot the entire sensing arm upwardly so that it is in a position to engage a trailer when it is subsequently coupled to the tractor. Because of this pivotal and telescopic movement caused by the springs 48 the sensing arm will accommodate trailers of varying length and height.

In addition to this function of accommodating trailers of varying length and height, the extensible construction of the sensing arm serves another purpose. This purpose is pictorially displayed in FIGURE 2 by comparing the solid line position of the sensing and support arm with the phantom showing of the arm. The phantom showing is of the trailer when the tractor and trailer have been rotated relatively approximately 85 degrees and the fifth wheel has ben moved rearwardly an appropriate distance.

The vertical sensing arm pivot pin 40 is forward of the king pin 19. Because of the horizontal space between these two, the sensing arm is pivoting about a different vertical axis than is the trailer. Accordingly, the distance from the vertical sensing arm pivot pin 40 to the forward edge of the trailer when the tractor and trailer are aligned as shown in solid lines in FIGURE 2 is different than the distance from the vertical sensing arm pivot to the forward edge of the trailer when the tractor and trailer have been rotated relatively as shown in phantom. This is true because the trailer is pivoting relative to the fifth wheel assembly about the axis of the king pin 19 while the sensing arm is pivoting about the axis of the vertical sensing arm pivot tube 75. The telescopic action of the sensing arm accommodates this variation in the distance.

One of the outstanding advantages of this invention resides in the arrangement for controlling the hydraulic cylinders 36 in response to rotation of the sensing arm about the vertical sensing arm pivot tube 75. This control is always at a rate and an amount proportional to the amount of relative turning of the tractor and trailer about the king pin 19. To achieve this control, a flat heart-shaped cam 51 is provided. This heart-shaped cam is best seen in FIGURE 5. The cam 51 is horizontally disposed and fixed to the pivot pin 40 and thus to the support arm 41 to rotate with it about the vertical sensing arm pivot tube 75. The cam 51 includes a pair of spaced lobes 52, 53 and a central dwell portion 54.

A vertically disposed cam follower pivot 55 is connected to the forward one of the cross plates 29. A cam follower arm 56 is provided which consists of a pair of plates which are fixed together in spaced relationship.

Figure 3:
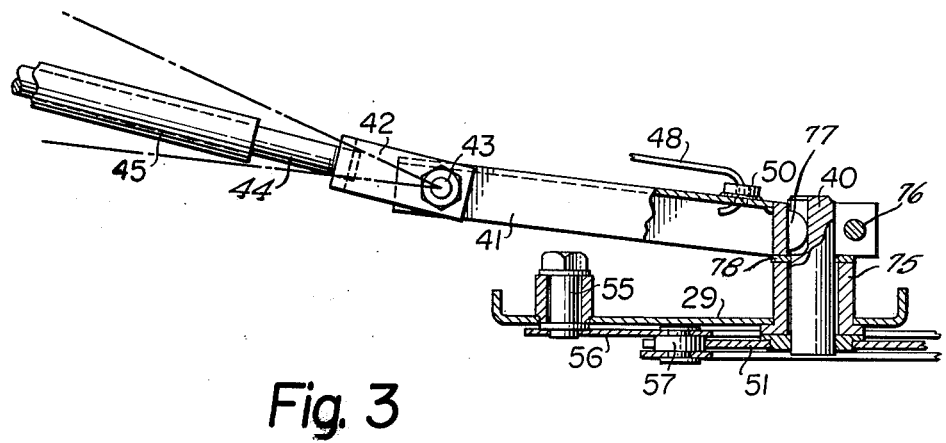
FIGURE 3 is an enlarged view of the sensing arm, cam and cam follower assembly as seen from the plane indicated by the line 3—3 of FIGURE 2.

This follower arm 56 is pivotally mounted on the cam follower pivot 55 and it straddles the cam 51, FIGURE 3.

A rotatable cam follower 57 is secured to the cam follower arm 56 between the plates of the arm. A cam follower spring 60 normally biases the cam follower 57 into engagement with the flat heart-shaped cam 51. This spring extends through an aperture in the end of the follower arm remote from the follower arm pivot to connect the spring to the follower arm. At its other end the follower spring 60 is connected to the rearwardmost cross plate 29.

Figure 4:
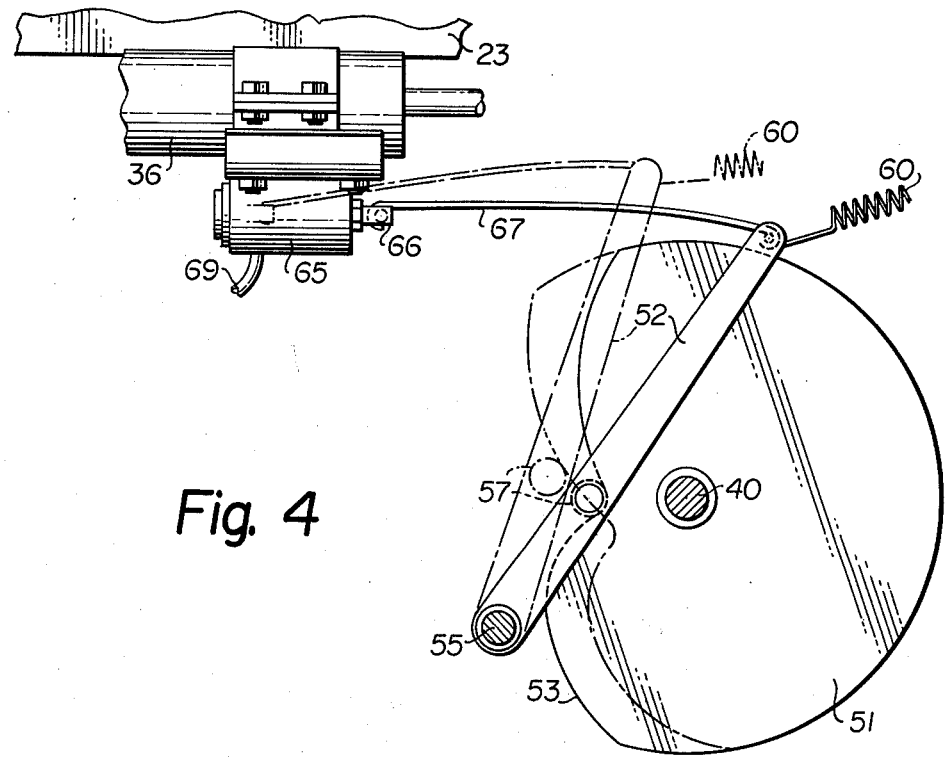
FIGURE 4 is an enlarged fragmentary plan view of the cam, cam follower and control valve; and, FIGURE 5 is an enlarged sectional view of the slide assembly as seen from the plane indicated by the line 5—5 of FIGURE 1.

When the tractor turns to the right as viewed in FIGURES 2 and 4, the cam 51 will rotate in a counter-clockwise direction about the vertical sensing arm pivot tube 75. This cam rotation will shift the cam relative to the tractor from the solid line position shown in FIGURE 4 to the phantom line position. As the cam rotates, the cam follower 57 will ride up on the lobe 52, the top lobe as viewed in the drawing, forcing the cam follower arm 56 to pivot in a counter clockwise direction about the cam follower pivot 55. This moves the follower from its solid line position to its phantom line position of FIGURE 4.

A hydraulic control valve 65 is secured to the channel 23 of the tractor frame and is visible in FIGURES 2 and 4. The control valve 65 is a conventional power steering gear valve such as those made by Bendix Corporation of Detroit, Michigan, Garrison Manufacturing Company of Los Angeles, California, Ross Gear and Tool Company, Inc. of Lafayette, Indiana, and others. One such valve suitable for use in the device of this invention is disclosed in United States Patent 2,896,589 issued July 18, 1959, to C. V. Gagen. The control valve 65 includes a control stem 66 which reciprocates along a longitudinal path paralleling the path of fifth wheel movement relative to the tractor. A yieldable control link 67 connects the follower arm 56 to the valve control stem 66.

A hydraulic pump 68 is provided in FIGURE 2. The pump is connected to the valve 65 and the cylinders 36 by conduits 69. The pump is driven by a power take-off 70 which is connected to tractor transmission 71.

When the follower arm 56 pivots from its solid line to its phantom line position of FIGURE 4 the yieldable control link 67 will force the valve control stem 66 forwardly. This will open the valve to deliver fluid under pressure from the hydraulic pump 68 to the hydraulic cylinders 36 in a manner which will drive the fifth wheel assembly rearwardly.

Assuming the amount of relative rotation of the tractor and trailer remains constant, the cam and cam follower arm will maintain their phantom positions of FIGURE 4. The cam and follower will move to the right as a unit as seen in FIGURE 4, which is rearwardly, relative to the control valve. The yieldable link 67 will pull the valve control stem 66 rearwardly until the stem is in its original position and the valve is shut off. The trailer will at this point have been moved rearwardly relative to the tractor an amount appropriate to provide the needed clearance. Through proper shaping of the cam this longitudinal relative movement of the tractor-trailer is always proportional to the amount of relative tractor and trailer rotation in either direction so that appropriate, but not excess, tractor-trailer clearance is obtained.

Reference to FIGURE 2 will add further clarity to this explanation. In FIGURE 2 the phantom line position of the cam 51 is the position which will be assumed after the trailer has rotated relative to the tractor to its phantom line position and the fifth wheel assembly has been retracted an appropriate distance. At this time the spring-receiving aperture in the end of the cam follower arm connected to the yieldable control link 67 is the same distance from the valve as it was prior to any relative turning of the tractor and trailer and the control valve 65 is again in an off position. This is true because the valve is fixed to the tractor and the entire fifth wheel support assembly 22 shifts rearwardly as a unit relative to the tractor and the valve as the cam and follower arm pivot relative to the fifth wheel frame.

The relative positions of the solid and phantom line showing of the cam follower in FIGURE 2 emphasize the need for the link 67 to be somewhat yieldable. With a rather abrupt turning of the tractor the hydraulic system will respond quickly enough to avoid any collision of the tractor and the trailer, but the turning may be so great that the follower moves a greater distance than can be immediately accommodated by the reciprocation of the valve control stem 66. Under these circumstances the yieldable link will bend to accommodate any excessive movement of the follower.

When the tractor-trailer rig returns from its phantom line position of FIGURE 2 to its solid-line position the fifth wheel assembly 22 also is returned to its solid line position. This is accomplished because clockwise relative rotation of the cam from its phantom line position permits the follower arm spring to rotate the follower arm in a clockwise direction. Rotation of the follower arm in a clockwise direction pulls the valve stem 66 rearwardly from its off position to energize the cylinders 36 in a forward direction. The cam follower spring 60 attempts to hold the follower against the cam, pulling it rearwardly as the cam will allow it to do so. Here again abrupt turning may have an effect on the mechanism in that the follower may be temporarily out of contact with the cam as the valve control stem limits the amount of clockwise pivotal movement of the follower. As the tractor-trailer rig concludes its relative rotation and the hydraulic mechanism concludes the forward movement of the fifth wheel assembly, the cam will act against the follower bringing the following and therefore the control valve to its off position.

Another of the features of this invention resides in the fact that the control valve is of a type where reciprocal valve controlling movement of the stem 66 is along a path paralleling the fifth wheel assembly movement. Further, the valve is so designed that rearward movement of the control stem 66 relative to the valve causes forward movement of the fifth wheel assembly. With this construction any slippage of the hydraulic cylinder as from leakage past the pistons in the hydraulic cylinders, will open the valve immediately. The valve is opened in a direction to energize the cylinders to force the fifth wheel assembly forward. Thus, a system is provided so that any leakage in the hydraulic cylinders will be immediately accommodated by the valve turning on to drive the fifth wheel assembly forward and overcome the effects of the leakage.

While the invention has been described with detail it is believed that it essentially comprises a coupling system for coupling two vehicles together in which a prime mover is interposed between the vehicles and a sensing means is connected to the prime mover and at least one of the vehicles so that a change in relative conditions of the two vehicles will energize the prime mover.

Although the invention has been described in its preferred form with a certain degree of particularity, it is understood that the present disclosure of the preferred form has ben made only by way of example and that numerous changes in the details of construction and the combination and arrangements of parts may be resorted to without departing from the spirit and the scope of the invention as hereinafter claimed.

What is claimed is:

1. In a vehicle including a frame mounted on wheels, the combination of:
   (a) coupling means for coupling a second vehicle;
   (b) said coupling means being movably mounted on the frame;

(c) a prime mover interposed between the frame and coupling means for causing selective relative movement therebetween; and (d) sensing means operatively connectable to such second vehicle and connected to the prime mover for sensing changes in the relative positions of the vehicles and selectively actuating the prime mover to move the coupling means and frame relatively whenever a predetermined change in the relative positions of the vehicles occurs.

2. The device of claim 1 wherein the sensing means actuation of the prime mover is responsive to the amount and rate of change in the relative positions of the vehicles.

3. In combination:
 (a) first and second vehicles each including a frame structure;
 (b) a king pin member connected to the first vehicle frame structure;
 (c) a fifth wheel member connected to the second vehicle frame structure and including means for connecting the members together to permit relative movement of the frame structures;
 (d) prime mover means connected to one of the members and to the associated frame structure; said one member and said associated frame structure being relatively movable; and,
 (e) sensing and control means between the vehicles for sensing relative movement of the vehicles and actuating the prime mover to shift said one member longitudinally relative to its associated frame structure in response to predetermined relative movement of the vehicles.

4. In a vehicle including a frame mounted on road wheels the combination of:
 (a) a fifth wheel movably mounted on the frame;
 (b) a prime mover interposed between the frame and fifth wheel for causing selective relative movement therebetween; and,
 (c) sensing means operatively connected to the fifth wheel and connected to the prime mover for sensing changes in the relative positions of the vehicles selectively actuating the prime mover to move the fifth wheel and frame relatively whenever a predetermined change in relative positions occurs.

5. In a highway vehicle including a frame mounted on road wheels the combination of:
 (a) a fifth wheel reciprocably mounted on the frame for connecting a second highway vehicle to the mentioned highway vehicle;
 (b) a prime mover interposed between the frame and fifth wheel for causing selective relative reciprocation therebetween, and
 (c) sensing means operatively connected to the fifth wheel and connected to the prime mover for sensing relative rotation of the vehicles and selectively actuating the prime mover to move the fifth wheel and frame relatively upon a predetermined amount of relative rotation of the vehicles.

6. The device of claim 5 wherein the sensing means is also responsive to relative longitudinal movement of the fifth wheel and frame wherein the sensing means energizes the prime mover to return the fifth wheel and frame to a desired position whenever a predetermined amount or relative longitudinal movement occasioned by slippage of the prime mover occurs.

7. In a highway tractor trailer assembly a fifth wheel construction comprising:
 (a) a fifth wheel slidably mounted on the tractor for longitudinal reciprocal movement;
 (b) power means interposed between the tractor and the fifth wheel for selectively causing relative reciprocation;
 (c) a power means control mounted on the tractor and controllably connected to the power means; and,
 (d) sensing means secured to the fifth wheel and connected to the trailer and the control for actuating the control and thereby actuating the power means to cause relative reciprocation between the fifth wheel and the tractor whenever predetermined relative movement of the tractor and trailer occurs.

8. In a highway tractor trailer assembly a fifth wheel construction comprising:
 (a) a tractor frame assembly;
 (b) a fifth wheel assembly slidably mounted on the frame assembly for longitudinal reciprocal movement;
 (c) power means interposed between the assemblies for selectively causing relative reciprocation;
 (d) a power means control mounted on one of the assemblies and controllably connected to the power means;
 (e) a sensing arm pivotally connected to the fifth wheel assembly and connected to the trailer;
 (f) a cam element and a cam follower element;
 (g) one of the elements being connected to the sensing arm for pivotal movement therewith; and,
 (h) the other of the elements being connected to the control for actuating the control and thereby actuating the power means to cause relative reciprocation between the assemblies.

9. The device of claim 8 wherein the cam is secured to the arm and the cam follower is pivotally mounted on the fifth wheel assembly for pivoting about an axis spaced from the arm pivot.

10. In a highway tractor-trailer assembly a fifth wheel construction comprising:
 (a) a fifth wheel slidably mounted on the frame for longitudinal reciprocal movement;
 (b) a hydraulic cylinder interposed between the tractor and the fifth wheel for selectively causing relative reciprocation;
 (c) a valve mounted on the tractor and controllably connected to the hydraulic cylinder; and,
 (d) sensing means connected to the fifth wheel and connected to the trailer and to the valve for actuating the valve and thereby actuating the cylinder to cause relative reciprocation between the fifth wheel and the tractor whenever there is relative rotation between the tractor and trailer.

11. The device of claim 10 wherein the sensing means includes a yieldable link connected to the valve.

12. The device of claim 10 wherein the valve has a reciprocating stem and is actuated by the stem and wherein the path of stem reciprocation parallels the assembly reciprocation such that any slippage in the cylinder will open the valve to energize the cylinder and overcome the slippage.

13. The device of claim 10 wherein actuation of the valve by the sensing means is proportional to the amount and rate of relative rotation of the tractor and trailer.

14. A motor vehicle comprising:
 (a) a tractor having a frame, connected road wheels supporting the frame and a cab on a forward portion of the frame;
 (b) said tractor frame including longitudinally disposed guide means rearward of the cab;
 (c) a fifth wheel support frame mounted on the guide means for reciprocation in a direct rectilinear path longitudinal of the tractor;
 (d) a fifth wheel mounted on the fifth wheel frame;
 (e) a hydraulic cylinder having one end connected to the tractor frame and the other end connected to the fifth wheel frame;
 (f) a control valve mounted on the tractor frame;
 (g) a cam pivotally mounted on the fifth wheel frame;
 (h) a sensing arm pivotally secured to the cam for pivotal movement with the cam about the vertical axis;

(i) the sensing arm being pivotal relative to the cam and adapted to engage a trailer;
(j) a spring secured to the sensing arm and biasing the sensing arm upwardly about the arm pivot to bring it into engagement with the trailer;
(k) a cam follower arm pivotally mounted on the fifth wheel frame;
(l) a cam follower on the follower arm for engagement with the cam;
(m) a second spring between the follower arm and the fifth wheel frame biasing the follower against the cam;
(n) a control link connected to the valve and the follower arm for actuating the valve when the follower arm is moved in response to movement of the cam;
(o) a hydraulic pump; and,
(p) conduits connecting the valve, the pump and the cylinder whereby movement of the valve in response to movement of the follower arm will actuate the cylinders.

15. The device of claim 14 wherein the tractor includes a motor and the pump is connected to the motor.

16. The device of claim 14 wherein the control link is longitudinally disposed and rearward movement of the control link causes forward movement of the fifth wheel relative to the tractor whereby any leakage in the cylinders will cause actuation of the valve and cylinders to overcome the leakage and shift the fifth wheel forwardly.

17. A motor vehicle comprising:
(a) a tractor having a frame, connected road wheels supporting the frame and a cab on a forward portion of the frame;
(b) said tractor frame including a longitudinally disposed parallel guide means rearward of the cab;
(c) a fifth wheel slide assembly mounted on the guide means for reciprocation in a direct rectilinear path longitudinal of the tractor;
(d) power means connected to the tractor frame and to the fifth wheel assembly;
(e) a control mounted on the tractor frame;
(f) a flat cam pivotally mounted on the fifth wheel assembly for pivotal movement about a vertical axis, the cam having a spaced pair of lobes and a dwell portion between the lobes;
(g) a sensing arm pivotally connected to the cam for pivotal movement with the cam about the vertical axis;
(h) the sensing arm being pivotal relative to the cam for selectively engaging a trailer;
(i) a spring secured to the sensing arm and biasing the sensing arm about the arm pivot;
(j) a cam follower arm pivotally mounted on the fifth wheel assembly;
(k) a cam follower on the follower arm normally engaging the dwell portion and selectively engageable with the lobes one at a time when the cam is rotated;
(l) a second spring between the follower arm and the fifth wheel frame biasing the follower against the cam; and,
(m) the follower arm being connected to the control for actuating the control when the follower arm is moved in response to movement of the cam to actuate the power means.

18. A motor vehicle comprising:
(a) a tractor having a frame, connected road wheels supporting the frame and a cab on a forward portion of the frame;
(b) said tractor frame including a pair of longitudinally disposed parallel guide tracks rearward of the cab;
(c) a pair of fifth wheel slides mounted on the guide tracks for reciprocation in a direct rectilinear path longitudinal of the tractor;
(d) a fifth wheel frame connecting the slides together;
(e) a fifth wheel mounted on the fifth wheel frame;
(f) prime mover means having one end pivotally connected to the tractor frame and the other end pivotally connected to the fifth wheel frame;
(g) a control means mounted on the tractor frame;
(h) a cam pivotally mounted on the fifth wheel frame for pivotal movement about a vertical axis;
(i) a sensing arm secured to the cam for pivotal movement with the cam about the vertical axis in response to relative rotation of the tractor and trailer and having one end engaged with the trailer;
(j) a cam follower arm mounted on the fifth wheel frame;
(k) a cam follower on the follower arm engaging with the cam; and,
(l) a control link connected to the control means and the follower arm for actuating the control means when the follower arm is moved in response to movement of the cam.

19. A motor vehicle comprising:
(a) a tractor having a frame, connected road wheels supporting the frame and a cab on a forward portion of the frame;
(b) a trailer including a king pin;
(c) said tractor frame including a pair of longitudinally disposed parallel guide tracks rearward of the cab;
(d) a pair of fifth wheel slides mounted on the guide tracks for reciprocation in a direct rectilinear path longitudinal of the tractor;
(e) a fifth wheel frame connecting the slides together;
(f) a fifth wheel mounted on the fifth wheel frame and removably secured to the king pin;
(g) a pair of hydraulic cylinders each having one end pivotally connected to the tractor frame and the other end pivotally connected to the fifth wheel frame;
(h) a control valve mounted on the tractor frame;
(i) a flat cam pivotally mounted on the fifth wheel frame for pivotal movement about a vertical axis, the cam having a spaced pair of lobes and a dwell portion between the lobes;
(j) a support arm secured to the cam for pivotal movement with the cam about the vertical axis;
(k) a sensing arm pivotally mounted on the support arm near one end for relative pivotal movement about a horizontal axis, the sensing arm and a trailer engaging hook near the other end, said hook being connected to the trailer for rotation therewith relative to the tractor whereby to cause corresponding rotation of the cam relative to the tractor;
(l) a spring secured to the sensing arm and biasing the sensing arm upwardly about the arm pivot;
(m) a cam follower arm pivotally mounted on the fifth wheel frame;
(n) a cam follower on the follower arm normally engaging the dwell portion and selectively engageable with the lobes one at a time when the cam is rotated;
(o) a second spring between the follower arm and the fifth wheel frame biasing the follower against the cam;
(p) a yieldable control link connected to the valve and the follower arm for actuating the valve when the follower arm is moved in response to movement of the cam;
(q) a hydraulic pump; and,
(r) conduits connecting the valve, the pump and the cylinders whereby movement of the valve in response to movement of the follower arm will actuate the cylinders to shift with the fifth wheel along the guide tracks.

20. A prime mover control mechanism responsive to relative rotation comprising:
(a) a pair of pivotally connected members;
(b) a control connected to one of the members;
(c) a cam pivotally mounted on the said one member for pivotal movement about an axis;
(d) a sensing arm secured to the cam for causing rotation thereof, the sensing arm being connected to the other of the members for rotation therewith relative to said one member;

(e) a cam follower arm pivotally mounted on said one member;

(f) a cam follower on the follower arm for engagement with the cam;

(g) biasing means between the follower arm and said one member biasing the follower against the cam;

(h) a prime mover connected to the control; and, (i) a control link connected to the control and the follower arm for actuating the control when the follower arm is moved in response to movement of the cam whereby to control the prime mover.

21. The control of claim 20 wherein the cam is a flat cam having a pair of spaced lobes and an intermediate dwell position.

22. The device of claim 20 wherein the link is yieldable.

23. A prime mover control mechanism responsive to relative rotation comprising:

(a) first and second pivotally connected members;

(b) a frame;

(c) said first member being mounted on the frame for relative reciprocal movement;

(d) a prime mover connected to the frame and to the first member;

(e) a control mounted on the frame and connected to the prime mover;

(f) a cam pivotally mounted on one of said members for pivotal movement about an axis;

(g) a sensing arm secured to the cam for causing rotation therewith, the sensing arm having its other end connected to the other of the members for rotation therewith relative to said one member;

(h) a cam follower arm pivotally mounted on said one member;

(i) a cam follower on the follower arm for engagement with the cam;

(j) biasing means between the follower arm and said one member biasing the follower against the cam; and, (k) a control link connected to the control and the follower arm for actuating the control when the follower arm is moved in response to movement of the cam whereby to control the prime mover.

24. The device of claim 23 wherein the control link is yieldable and wherein actuation of the control is in a rectilinear path paralleling the path of reciprocal movement of the first member.

References Cited by the Examiner
UNITED STATES PATENTS

| | | | |
|---|---|---|---|
| 1,995,920 | 3/35 | Gurton et al. | 280—438 |
| 2,714,018 | 7/55 | Colpo | 280—438 |
| 2,807,477 | 9/57 | Tuso | 280—438 X |

PHILIP ARNOLD, *Primary Examiner.*

LEO FRIAGLIA, *Examiner.*